US010712859B2

(12) United States Patent
Hu

(10) Patent No.: US 10,712,859 B2
(45) Date of Patent: Jul. 14, 2020

(54) TOUCH-SENSITIVE CONTROL DEVICE

(71) Applicant: Touchplus Information Corp., New Taipei (TW)

(72) Inventor: Shih-Hsien Hu, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 246 days.

(21) Appl. No.: 15/493,298

(22) Filed: Apr. 21, 2017

(65) Prior Publication Data

US 2017/0220192 A1 Aug. 3, 2017

Related U.S. Application Data

(63) Continuation-in-part of application No. 13/895,333, filed on May 15, 2013, now abandoned.

(30) Foreign Application Priority Data

Aug. 3, 2012 (TW) .............................. 101128094 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ........ G06F 3/041; G06F 3/0416; G06F 3/044; G06F 3/0412
See application file for complete search history.

(56) References Cited

U.S. PATENT DOCUMENTS

| 8,816,967 | B2* | 8/2014 | Lyon | G06F 3/044 178/18.06 |
| 8,816,986 | B1* | 8/2014 | Park | G06F 3/044 345/173 |
| 2005/0270039 | A1* | 12/2005 | Mackey | G06F 3/044 324/660 |
| 2006/0097991 | A1* | 5/2006 | Hotelling | G06F 3/044 345/173 |
| 2007/0229469 | A1* | 10/2007 | Seguine | G06F 3/011 345/173 |

(Continued)

FOREIGN PATENT DOCUMENTS

| CN | 102214049 A | 10/2011 |
| CN | 102279680 A | 12/2011 |

*Primary Examiner* — Patrick N Edouard
*Assistant Examiner* — Peijie Shen
(74) *Attorney, Agent, or Firm* — WPAT, PC

(57) ABSTRACT

A touch panel includes a substrate defining thereon a touch sensing region; a sensor array formed in the touch sensing region; and connecting lines arranged on the substrate and corresponding to the sensor elements one on one. The sensor array consists of sensor elements separately positioned on the substrate, and defined as a plurality of groups, wherein the sensor elements in the same group include a central sensor element and a plurality of surrounding sensor elements. Each of the connecting lines is connected to one and only one of the sensor elements corresponding thereto. The surrounding sensor elements are defined as a plurality of sets of surrounding sensor elements, which are respectively driven with corresponding connecting line or lines, and return signals for determining which part of the central sensor element is touched.

14 Claims, 16 Drawing Sheets

(56) References Cited

U.S. PATENT DOCUMENTS

| | | | |
|---|---|---|---|
| 2008/0158167 A1* | 7/2008 | Hotelling | G06F 3/0416 345/173 |
| 2009/0073127 A1 | 3/2009 | Amiri | |
| 2009/0084613 A1* | 4/2009 | Yang | G06F 3/044 178/18.06 |
| 2009/0187375 A1* | 7/2009 | Kinoshita | G01B 7/008 702/158 |
| 2011/0216038 A1* | 9/2011 | Stolov | G06F 3/044 345/174 |
| 2012/0050216 A1* | 3/2012 | Kremin | G06F 3/0416 345/174 |
| 2012/0176338 A1* | 7/2012 | Lee | G06F 3/041 345/174 |
| 2012/0218224 A1* | 8/2012 | Lin | G06F 3/044 345/174 |
| 2012/0262411 A1* | 10/2012 | Ahn | G06F 3/0416 345/174 |
| 2012/0262419 A1* | 10/2012 | Hershman | G06F 3/044 345/174 |
| 2013/0181942 A1* | 7/2013 | Bulea | G06F 3/044 345/174 |
| 2013/0249858 A1* | 9/2013 | Chang | G06F 3/044 345/174 |
| 2013/0307810 A1* | 11/2013 | Verweg | G06F 3/0412 345/174 |
| 2014/0132534 A1* | 5/2014 | Kim | G06F 3/0412 345/174 |
| 2015/0116261 A1* | 4/2015 | Ahn | G06F 3/0418 345/174 |
| 2015/0145821 A1* | 5/2015 | Kim | G06F 3/0412 345/174 |
| 2015/0177878 A1* | 6/2015 | Cheng | G06F 3/044 345/174 |
| 2015/0370356 A1* | 12/2015 | Hwang | G06F 3/041 345/173 |
| 2016/0162102 A1* | 6/2016 | Shahparnia | G06F 3/0416 345/174 |
| 2016/0216836 A1* | 7/2016 | Yao | G06F 3/0418 |
| 2017/0090626 A1* | 3/2017 | Lee | G06F 3/044 |
| 2017/0371471 A1* | 12/2017 | Kim | G06F 3/0414 |

* cited by examiner

720

TOUCH-SENSITIVE CONTROL DEVICE

CROSS-REFERENCE TO RELATED APPLICATIONS

The present application is a continuation-in-part application claiming benefit from a pending U.S. patent application bearing a Ser. No. 13/895,333 and filed May 15, 2013, contents of which are incorporated herein for reference.

FIELD OF THE INVENTION

The present invention relates to a touch-sensitive control device, and more particularly to a touch-sensitive control device executing touch sensing with a modified sensor array.

BACKGROUND OF THE INVENTION

Capacitive sensing is a technology based on capacitive coupling which takes human body capacitance as input. The capacitive touch sensor has been widely used in smart phones, tablets and even in the IT displays up to 23 inches, e.g. Notebooks, laptop trackpads, digital audio players, computer displays, ALL-in-one PCs, with the multi-touch features.

More and more design engineers are selecting capacitive sensors for their versatility, reliability and robustness, unique human-device interface and cost reduction over mechanical switches.

Capacitive sensors detect anything that is conductive or has a dielectric different than that of air. While capacitive sensing applications can replace mechanical buttons with capacitive alternatives, other technologies such as multi-touch and gesture-based touchscreens are also premised on capacitive sensing.

Capacitive sensors are constructed from many different media, such as copper, Indium Tin Oxide (ITO) and printed ink. Copper capacitive sensors can be implemented on Printing Circuit Boards (PCBs) as well as on flexible material. Indium Tin Oxide allows the capacitive sensor to be up to 90% transparent for one layer solutions, such as touch phone screens.

There are two types of capacitive sensing system: mutual capacitance, where the object (finger, conductive stylus) alters the mutual coupling between row and column electrodes, which are scanned sequentially; and self- or absolute capacitance where the object (such as a finger) loads the sensor or increases the parasitic capacitance to ground. In both cases, the difference of a preceding absolute position from the present absolute position yields the relative motion of the object or finger during that time.

FIGS. 1A and 1B show the structures of the traditional two-dimensional sensor arrays (1010, 1020). To have better coordination accuracy of the touched locations, the touch sensors often come with two-dimensional sensor arrays, including Double-sided Indium Tin Oxide (DITO) or Single-sided Indium Tin Oxide (SITO). The size of the sensor element from the sensor array is about the finger size (5-8 mm). The patterns of the sensor elements are mostly as the bar shape, the diamond shape or other polygon shape. For example, FIG. 1A shows that the pattern of the sensor elements (1018, 1016) in a two-dimensional sensor array 1010 is the bar shape and the two-dimensional sensor array 1010 includes a bottom layer 1012 and a top layer 1014, and FIG. 1B shows that the pattern of the sensor element 1022 in a two-dimensional sensor array 1020 is the diamond shape.

By referring to FIG. 1B, the connecting line "Xm" attaches to the m-th electrode in the horizontal axis, and the connecting line "Yn" attaches to the n-th electrode in the logitudinal axis. Thus, the trace routing for the two-dimensional sensor array 1020 whose number of traces is the number of electrodes in the horizontal axis plus the number of electrodes in the longitudinal axis, i.e., m+n, is easier than the one-dimensional sensor array.

FIGS. 2A and 2B show the structures of the traditional one-dimensional sensor arrays (2010, 2020). As the cost is concerned, especially the touch panel module takes a certain amount of total system cost, the one-dimensional sensor array came up, however, with the compromise of lower coordination accuracy. In order to have the multi-touch features on the one-dimensional sensor, the pattern design of sensor element becomes crucial. For example, FIG. 2A shows that the pattern of the sensor elements 2012 in a one-dimensional sensor array 2010 is the triangle shape, and FIG. 2B shows that the pattern of the sensor elements 2022 in a one-dimensional sensor array 2020 is the saw-tooth shape.

The sensor elements should be normally small while maintaining the touch accuracy or the resolution. This makes the trace routing difficult for the individual sensor element under the defined active area of the touch sensor. For example, FIG. 2B illustrates that the trace routing of the circuit 2024 for the individual sensor element 2022 is difficult under the defined active area of the one-dimensional sensor array 2020.

In general, the two-dimensional sensor array constructed as a matrix-like or keyboard-like structure has less constraint on the trace routing and provides much better touch accuracy comparing to the one-dimensional sensor array for multi-touch applications. The major drawback is the high cost in the manufacture.

On the other hand, one-dimensional sensor array is bounded by the routing space providing barely satisfied touch accuracy, but with the advantage from the cost. Under the limitation of touch accuracy, the size of one-dimensional sensor array for multi-touch is limited under 5 inches.

Currently, the capacitive touch panel with the sensor elements composed of a single material layer transmits signals from each sensor element by a separate connecting line, and determines the occurrence of the touch on the basis of the change of the singles from each sensor element directly. Thus, although the fabrication cost and working hours are reduced, it requires much more connecting lines to achieve the sensing accuracy, and results in difficulties on the design of wiring and connecting interface. On the other hand, when reducing the number of connecting lines, it will reduce the number of sensor elements and thus the sensing accuracy. Therefore, it is desirable to create a sensor array to resolve the above-mentioned issues.

SUMMARY OF THE INVENTION

Therefore, the present invention provides a touch-sensitive control device executing touch sensing with a modified sensor array.

An aspect of the present invention relates to a touch panel, which comprises a substrate defining thereon a touch sensing region; a sensor array formed in the touch sensing region and consisting of sensor elements separately positioned on the substrate, and defined as a plurality of groups, wherein the sensor elements in the same group include a central sensor element and a plurality of surrounding sensor elements; and connecting lines arranged on the substrate and corresponding to the sensor elements one on one, wherein each of the connecting lines is connected to one and only one of the sensor elements corresponding thereto; wherein the surrounding sensor elements are defined as a plurality of sets of surrounding sensor elements, which are respectively driven with corresponding connecting line or lines, and return signals for determining which part of the central sensor element is touched.

Another aspect of the present invention relates to a touch panel, which comprises a substrate defining thereon a touch sensing region; a sensor array formed in the touch sensing region and consisting of sensor elements separately positioned on the substrate; and connecting lines arranged on the substrate and corresponding to the sensor elements one on one, wherein each of the connecting lines is connected to one and only one of the sensor elements corresponding thereto, and at least a first one and a second one of the connecting lines are disposed adjacent to each other; wherein the first one of the connecting lines serves as a driving signal line, and applied thereto a driving signal to induce a capacitive coupling to the second one of the connecting lines so as to drive the sensor element which the second one of the connecting lines is connected to.

A further aspect of the present invention relates to a touch panel, which comprises a substrate defining thereon a touch sensing region; a sensor array formed in the touch sensing region and consisting of sensor elements separately positioned on the substrate; connecting lines arranged on the substrate and corresponding to the sensor elements one on one; and at least one dummy line disposed adjacent to one of the connecting lines; wherein the dummy line serves as a driving signal line, and a driving signal is applied to the driving signal line to induce a capacitive coupling to the adjacent connecting line so as to drive the sensor element which the adjacent connecting lines is connected to.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In order to fully understand the manner in which the above-recited details and other advantages and objects according to the invention are obtained, a more detailed description of the invention will be rendered by reference to the best-contemplated mode and specific embodiments thereof. The following description of the invention is made for the purpose of illustrating the general principles of the invention and should not be taken in a limiting sense; it is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein. The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section. Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Preferred embodiments and aspects of the invention will be described to explain the scope, structures and procedures of the invention. In addition to the preferred embodiments of the specification, the present invention can be widely applied in other embodiments.

The invention improves the one-dimensional sensor array, and optimizes the performance of the touch system with the overall considerations including the pattern design of one-dimensional sensor array and the driving scheme of the control circuit.

Figure 1A:
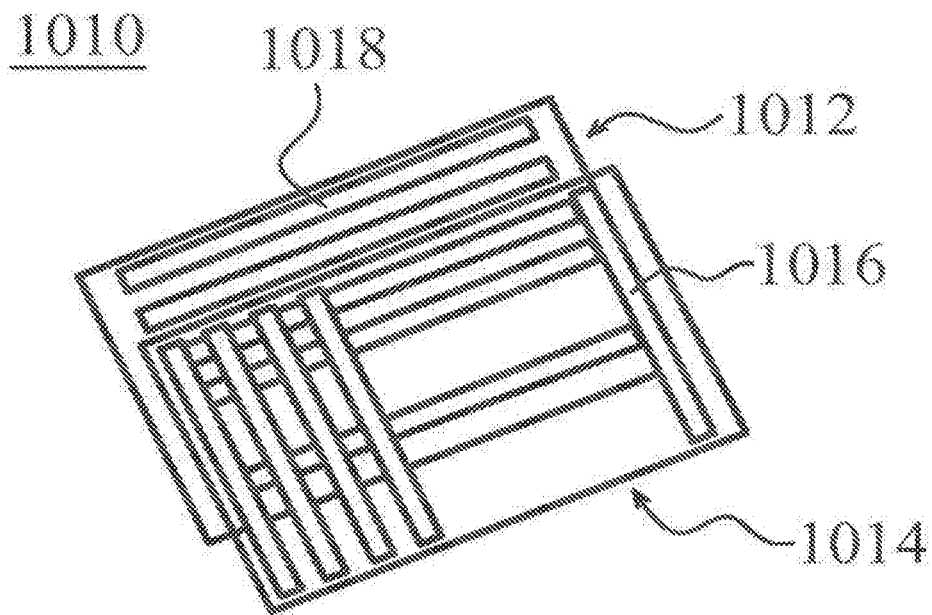
FIGS. 1A and 1B show the structures of the traditional two-dimensional sensor arrays.
Figure 1B:
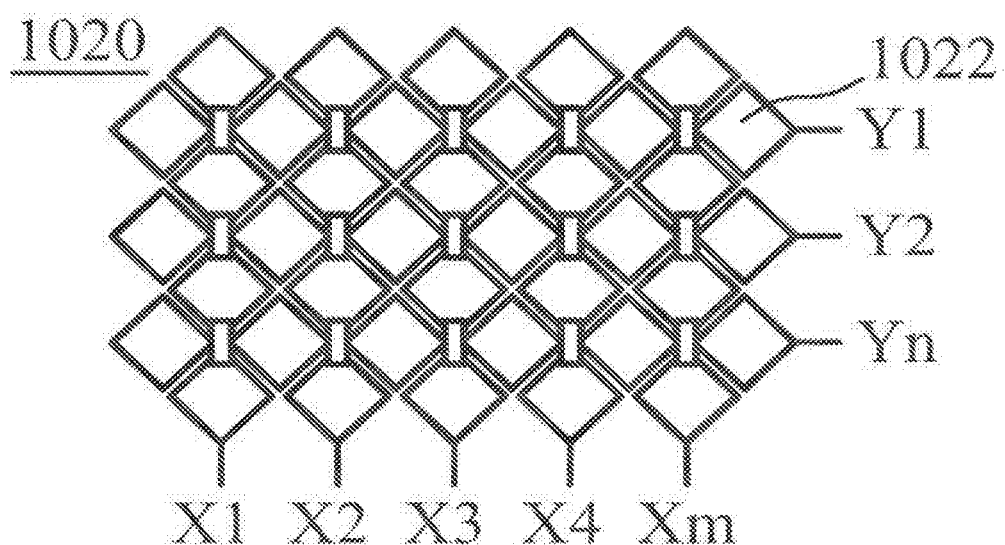
Figure 2A:
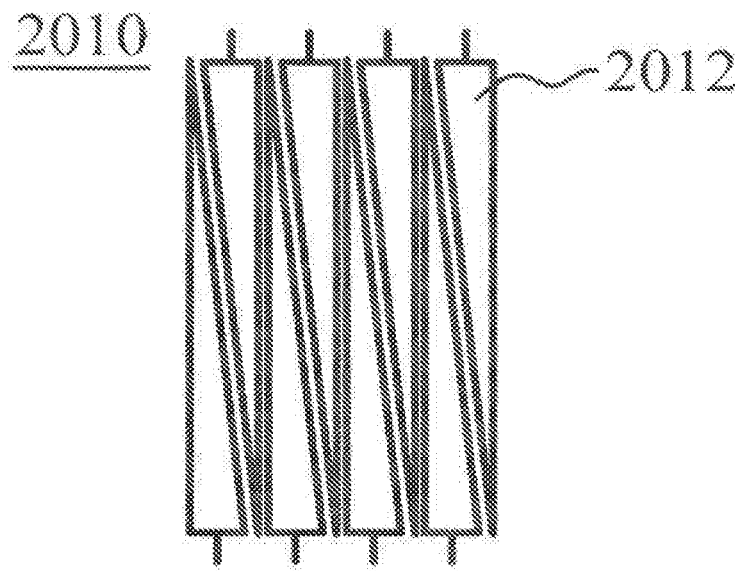
FIGS. 2A and 2B show the structures of the traditional one-dimensional sensor arrays.
Figure 2B:
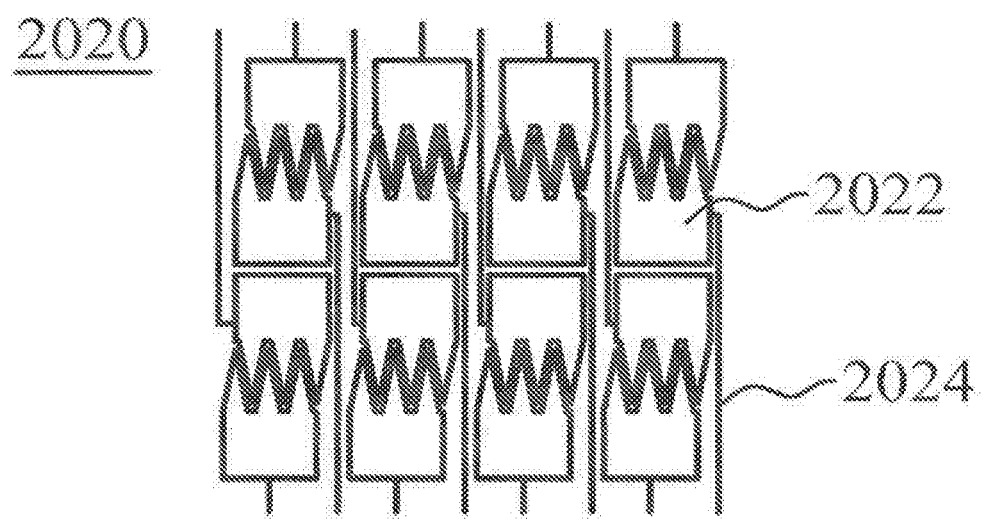
Figure 3:
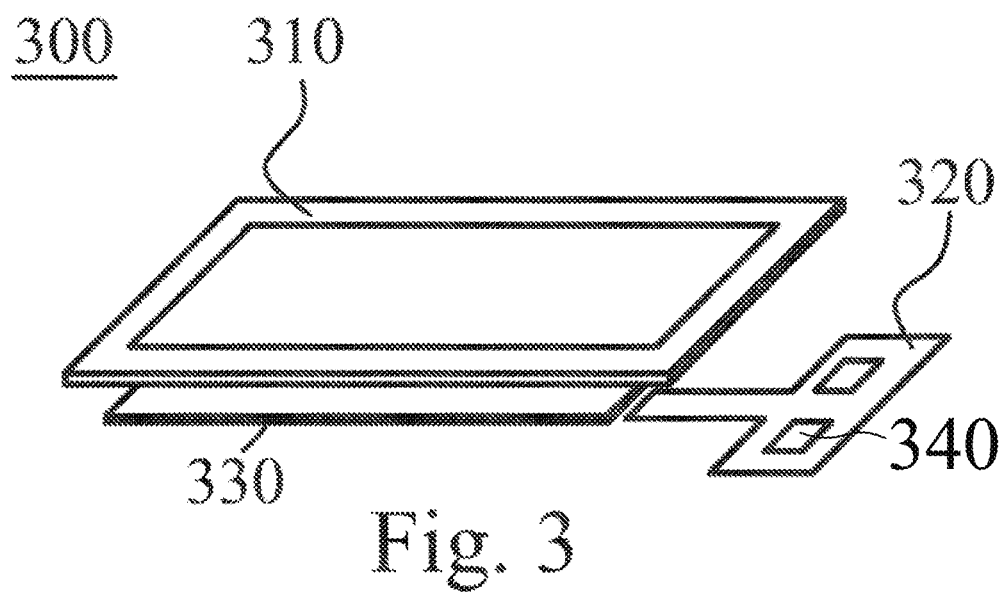
FIG. 3 illustrates layers of a touch panel according to an embodiment of the invention.

FIG. 3 illustrates layers of a touch panel according to an embodiment of the invention. The touch panel 300 comprises: a sensor array 330; a cover lens 310 positioned over the sensor array 330 for shielding the sensor array 330; and a control circuit 340 positioned on a circuit board 320, e.g., Printing Circuit Board (PCB) or Flexible Printing Circuit Board (FPC), and attached to the electrodes of the sensor array 330 with cables 342. The control circuit 340 can probe the touch signal on the sensor array 330 and report the touched coordination to the host system of the touch panel.

Figure 4A:
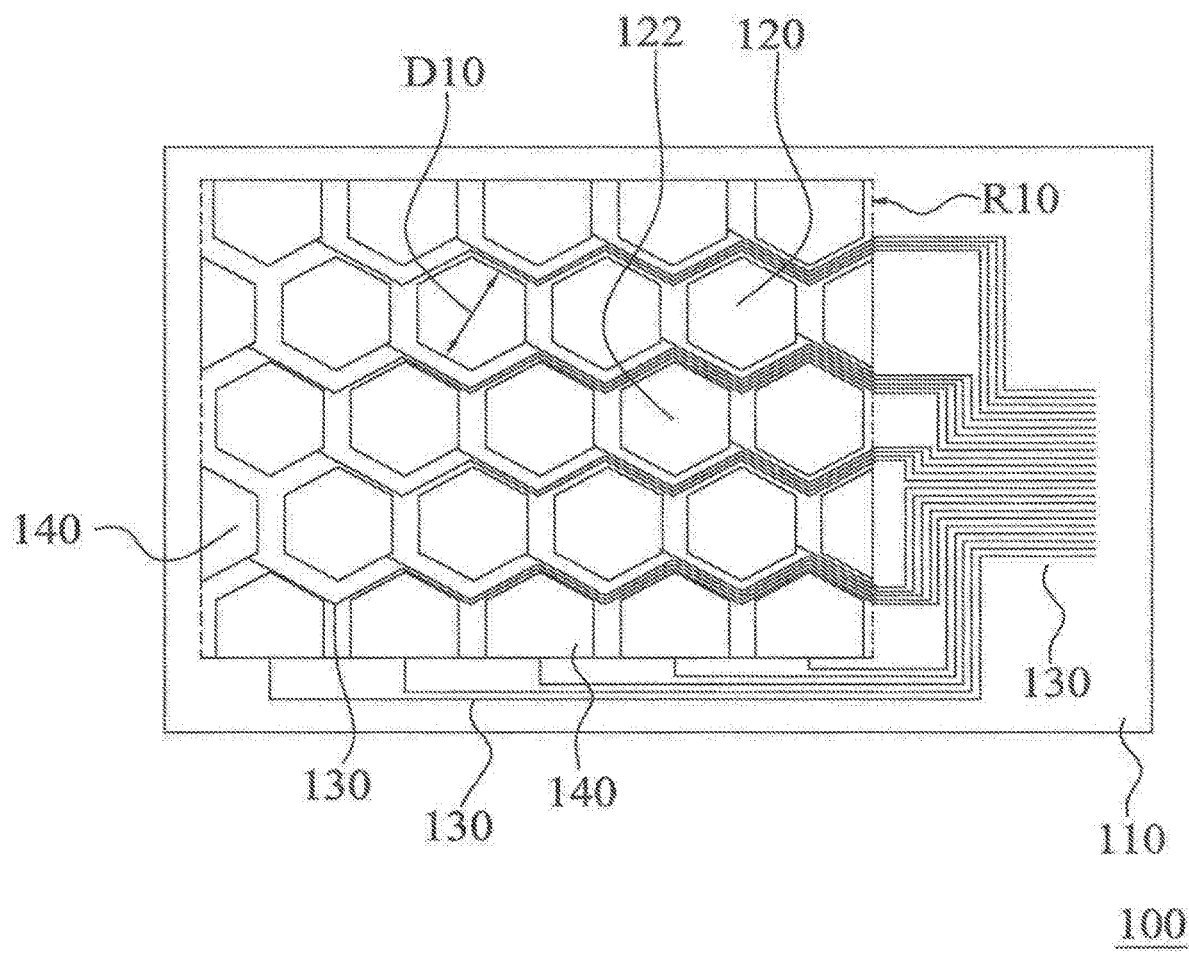
FIG. 4A is a schematic diagram of an embodiment of the touch panel of the present invention.

FIG. 4A is a schematic diagram of an embodiment of the touch panel of the present invention. The touch panel 100 of the present invention includes: a substrate 110, a plurality of first sensor elements 120, and a plurality of connecting lines 130. These first sensor elements 120 are arranged on the substrate 110, and each of the first sensor elements 120 are separated from each other and are electrically isolated. Each of some sensor elements of the first sensor elements 120 is surrounded by six other nearby first sensor elements 120, for example, the sensor element 122 shown in FIG. 4A. For example, a first sensor element 120 is surrounded by six first sensor elements 120. However, the first sensor element 120 at the edge of the substrate 110 may not be surrounded by six first sensor elements 120. The connecting line 130 is disposed on the substrate 110. Each connecting line 130 is connected to a corresponding one of the first sensor elements 120. And, each first sensor element 120 is connected to a corresponding connecting line 130.

FIGS. 4B-4E illustrates how the touch panel of FIG. 4A determines the touched position. Each of FIGS. 4B, 4C, 4D and 4E schematically illustrates a portion of the sensor array for exemplifying purpose, wherein a central sensor element 120A is surrounded by six sensor elements 120B, 120C, 120D, 120E, 120F and 120G in this embodiment. It is understood that each of the sensor elements 120B, 120C, 120D, 120E, 120F and 120G is also central to and surrounded by other sensor elements. In an embodiment illustrated in FIG. 4B, the control circuit 340 periodically sends a detecting signal S1 to each of the first sensor elements 120 including the sensor elements 120A to 120G, and receives a returned signal from each of the sensor elements 120 in response to the detecting signal S1. When the intensities of the signals returned from the sensor elements become differentiated, it is determined a touch operation or a gesture occurs. For example, if the signal intensity returned from the sensor element 120A is the highest among the sensor elements, a touched position is determined to be at the sensor element 120A, as indicated by the circle C1. If there are more than one sensor element returning higher signal intensities than other sensor elements, a touched position is determined to be an area adjoining to those sensor elements. For example, if the signal intensities returned from the sensor element 120A and the sensor element 120C are higher than the other sensor elements, a touched position is determined to be at an area between and/or covering the sensor element 120A and the sensor element 120C.

While the touched position has been located as described above, the touched position can be further located in a more precise manner. That is, the detection is further performed in groups. FIG. 4C schematically illustrates one of the groups and shows how it works. In each group, there are central sensor element, e.g. the sensor element 120A, and surrounding sensor elements, e.g. the sensor elements 120B, 120C, 120D, 120E, 120F and 120G. The control circuit 340 sends a detecting signal S2 to a set of three adjacent sensor elements of the six first sensor elements in the same group at the same time, e.g. the set consisting of the sensor elements 120B, 120C and 120D, and receives returned signals from the set of sensor elements. Subsequently, the detecting signal S2 is sent to next set of three adjacent sensor elements, e.g. the set consisting of the sensor elements 120C, 120D and 120E, and receives returned signals, and so on. Intensities of all the sets of returned signals are then referred to for further determining which part of the sensor element 120A is touched. For example, when the set of returned signals from the set of sensor elements 120B, 120C and 120D have higher intensities than the others, it is determined that the half of the sensor element 120A closer to the sensor elements 120B, 120C and 120D, e.g. a portion indicated by the circle C2, is touched.

Figure 4B:
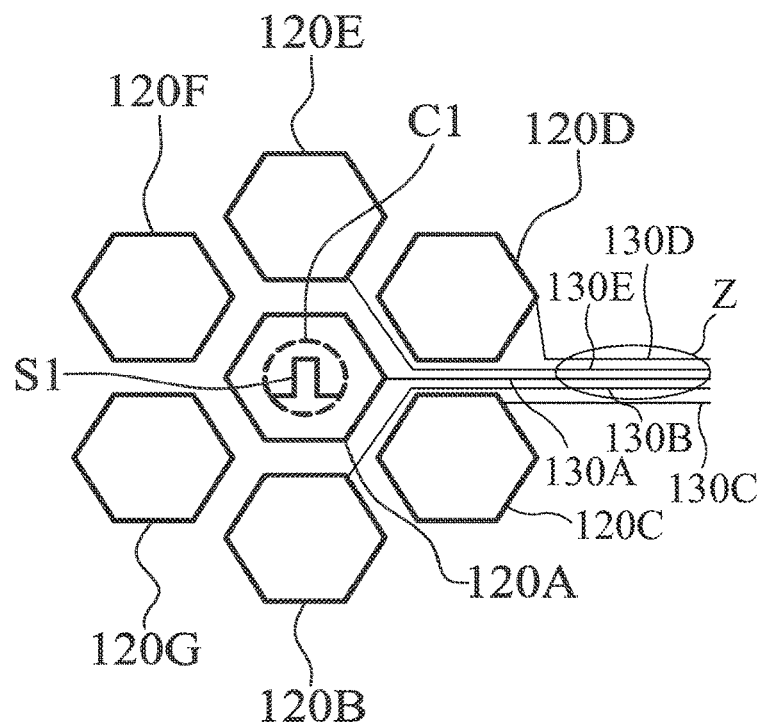
FIGS. 4B-4E illustrates how the touch panel of FIG. 4A determines the touched position.
Figure 4C:
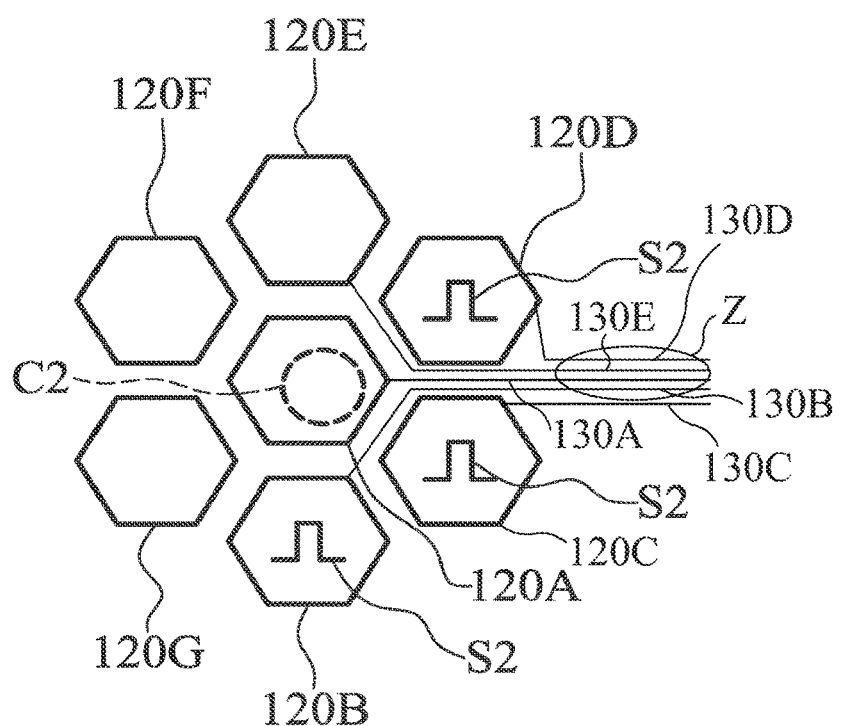
Figure 4D:
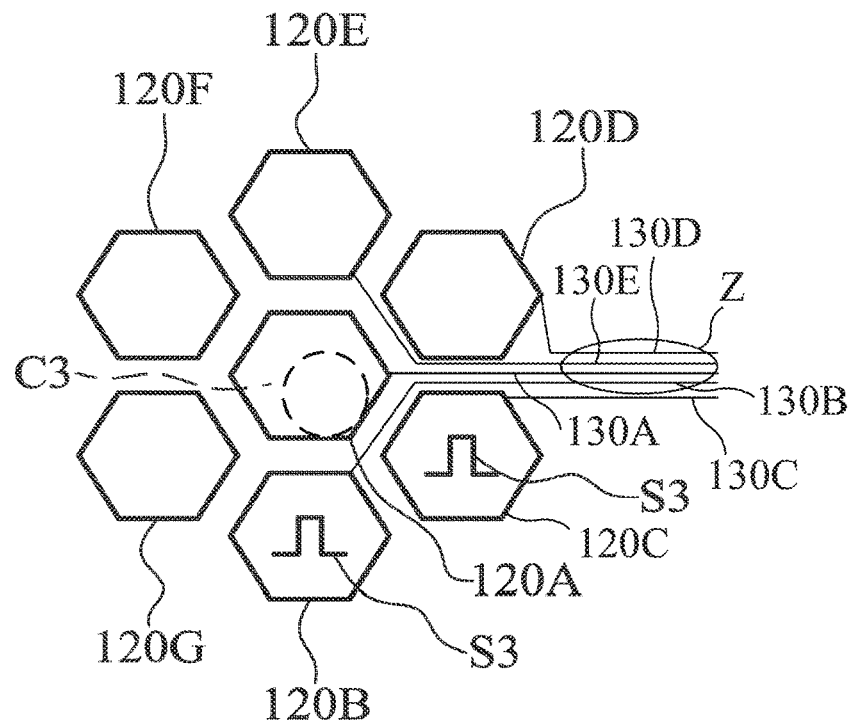

In an alternative grouping embodiment as illustrated in FIG. 4D, the control circuit 340 sends a detecting signal S3 to a set of two adjacent sensor elements of the six first sensor elements in the same group at the same time, e.g. the set consisting of the sensor elements 120B and 120C, and receives returned signals from the set of sensor elements. Subsequently, the detecting signal S3 is sent to next set of two adjacent sensor elements, e.g. the set consisting of the sensor elements 120C and 120D, and receives returned signals, and so on. Intensities of all the sets of returned signals are then referred to for further determining which part of the sensor element 120A is touched. For example, when the set of returned signals from the set of sensor elements 120B and 120C have higher intensities than the others, it is determined that the third of the sensor element 120A closer to the sensor elements 120B, 120C and 120D, e.g. a portion indicated by the circle C3, is touched.

Likewise, the control circuit 340 may sequentially send a detecting signal S4 to each sensor element in the same group, and receives returned signals from each the sensor element. Intensities of the returned signals are then referred to for further determining which part of the sensor element 120A is touched. For example, when the returned signal from the sensor element 120B has the highest intensity, it is determined that the sixth of the sensor element 120A closer to the sensor element 120B, e.g. a portion indicated by the circle C4, is touched.

Figure 4E:
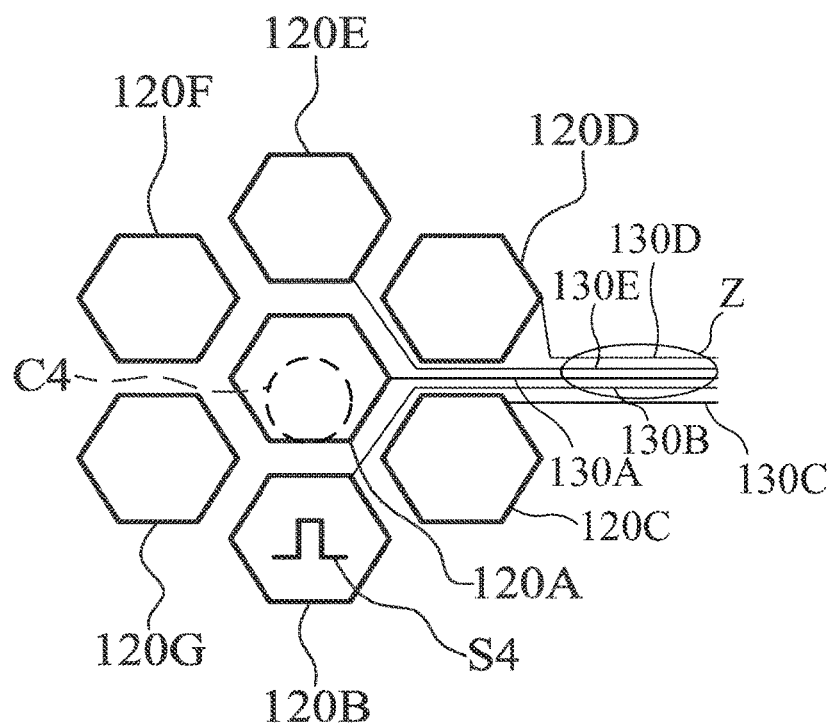

It is to be noted that the touch-sensing control methods as illustrated in FIGS. 4C, 4D and 4E may also be executed independently from the touch-sensing control method as illustrated in FIG. 4B. Furthermore, the touch-sensing control methods as illustrated in FIGS. 4C, 4D and 4E may also be combined for further improving precision of touch sensing control.

It should be noted, the "touched" positions in the above-mentioned examples can be replaced by the "approached" position since the variation of the capacitance value of the capacitive touch panel can be resulted from the approaching of the user's fingertip or stylus without the user's fingertip or stylus contacting the capacitive touch panel. Therefore, the touch panel 100 of the present invention can not only detect the position where the charged object touches the touch panel 100, but also detect the position where the charged object approaches the touch panel 100.

In view of the foregoing, the capacitance between two adjacent sensor elements 120 is used to determine not only which sensor element 120 is touched, but also which part of the sensor element 120 is touched, e.g. which side, which corner, or which tip. Compared to the prior art which directly detect the touched position by each sensor element, the touch panel 100 of the present invention can achieve much higher detecting accuracy with the same number of sensor elements. On the other hand, in the same detecting area, the touch panel 100 of the present invention can use less number of sensor elements to achieve the same detecting accuracy as the conventional techniques. Therefore, the present invention can significantly reduce the number of connecting lines connected to the sensor elements, and makes the design of the wiring and connecting interface much easier.

Figure 4F:
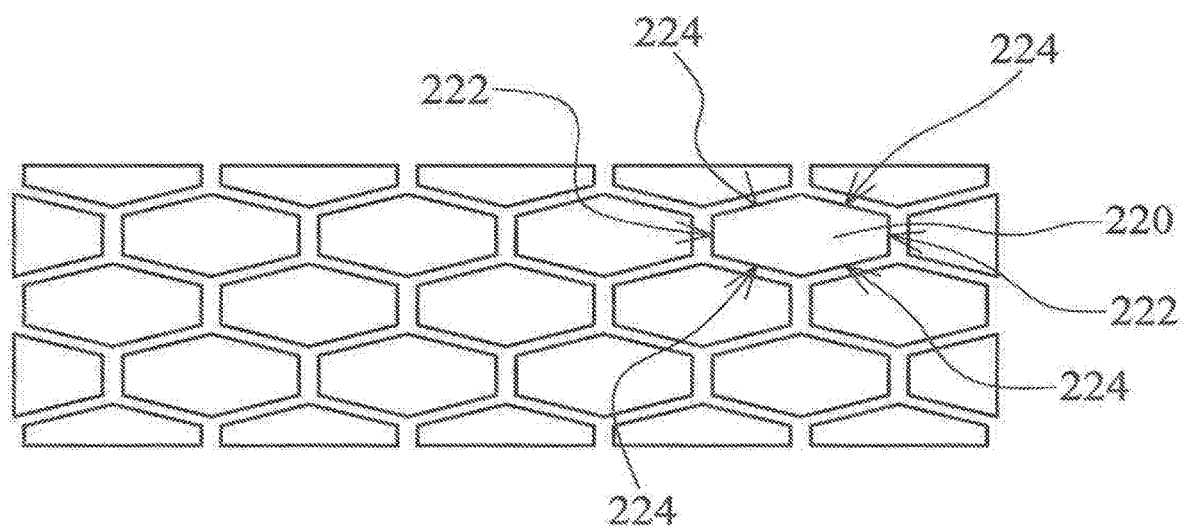
FIG. 4F shows the hexagonal sensor elements with different sizes in different directions.

The touch panel 100 of the present invention can integrate the capacitance values of two adjacent first sensor elements 120 to increase accuracy. Basically, the more adjacent first sensor elements 120 that each of the first sensor elements 120 has, the better the accuracy is. However, if the number of the adjacent sensor elements of each sensor elements is greater than six, these sensor elements cannot be arranged to form the symmetrical pattern. Therefore, the number "six" is chosen as the number of the first sensor elements 120 that are adjacent to each of the first sensor elements 120. In this case, the first sensor element 120 may be hexagonal, and, of course, circular or other shapes. The hexagonal first sensor element 120 has, for example, three pairs of opposite edges, edges of each pair are parallel to each other. The first sensor element 120 in the first embodiment of the present invention is regular hexagonal. However, to match the touching range required by the actual product, the sensor elements can be hexagonal with different sizes in different directions, similar to the shape of the regular hexagon compressed in a certain direction, for example, the sensor element 220 shown in FIG. 4F. The distances between the opposite edges of the three pairs are different. For example, the distance between a pair of opposite edges 222 is greater than the distance between each pair of opposite edges 224.

By referring to FIG. 4A, the distance D10 of each pair of opposite edges of the first sensor elements 120 is, for example, 9 mm to 18 mm. Specifically, the size of the first sensor elements 120 is smaller than the area that two fingertips occupy. Therefore, the touching of each fingertip can be exactly distinguished to achieve the purpose of detecting multi-touch.

The sensor element with the polygon shape has more adjacent edges to the neighbor sensor elements. That means more possibilities to have better accuracy of finger touch by stimulating the adjacent sensor elements. Therefore, a shape with more edges provides more touch signals from different adjacent sensor elements, and thus gets more precise results.

However, the ability of a shape to fill up an area by repeating the same shape is also required in terms of geometry. And the hexagonal shape has the most edges among the shapes that can be used to fill up an area by repeating the same shapes.

The combination of three, four and more sensor element may be used to indicate certain output signal. Therefore, the unit of the sensor configuration may provide multiple output signals to indicate different instructions.

For example, for each of of the hexagonal sensor elements, the number of stimulus combinations from the adjacent sensor elements is:

$$P(6,6)+P(6,5)+P(6,4)+P(6,3)+P(6,2)+P(6,1)=1+6+15+20+15+6=63;$$

it indicates that the present invention may provide miltiple output signals by the sensing unit.

Because most common shapes to fill up the area symmetry are the triangles and the squares, the numbers of stimulus combinations in the triangle and square sensor elements are calculated in the below to prove that the number of stimulus combinations in the hexagonal sensor elements is larger than that in the triangle or square sensor elements.

Figure 5A:
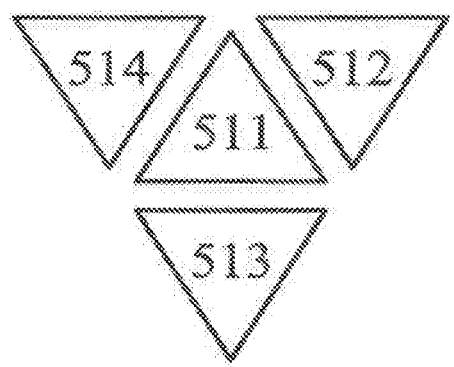
FIG. 5A illustrates the connecting structure of the triangle sensor elements 511-514.

FIG. 5A illustrates the connecting structure of the triangle sensor elements 511-514. For each of of the triangle sensor elements, the number of stimulus combinations from the adjacent sensor elements is:

$$P(3,3)+P(3,2)+P(3,1)=1+3+3=7$$

Figure 5B:
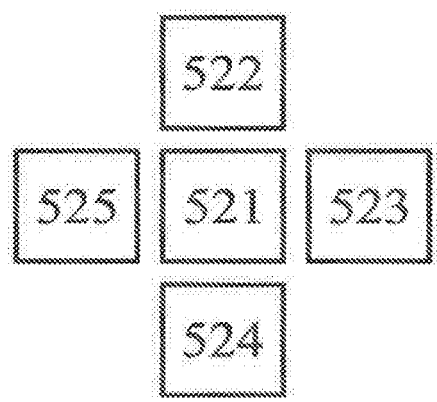
FIG. 5B illustrates the connecting structure of the square sensor elements 521-525.
Figure 6A:
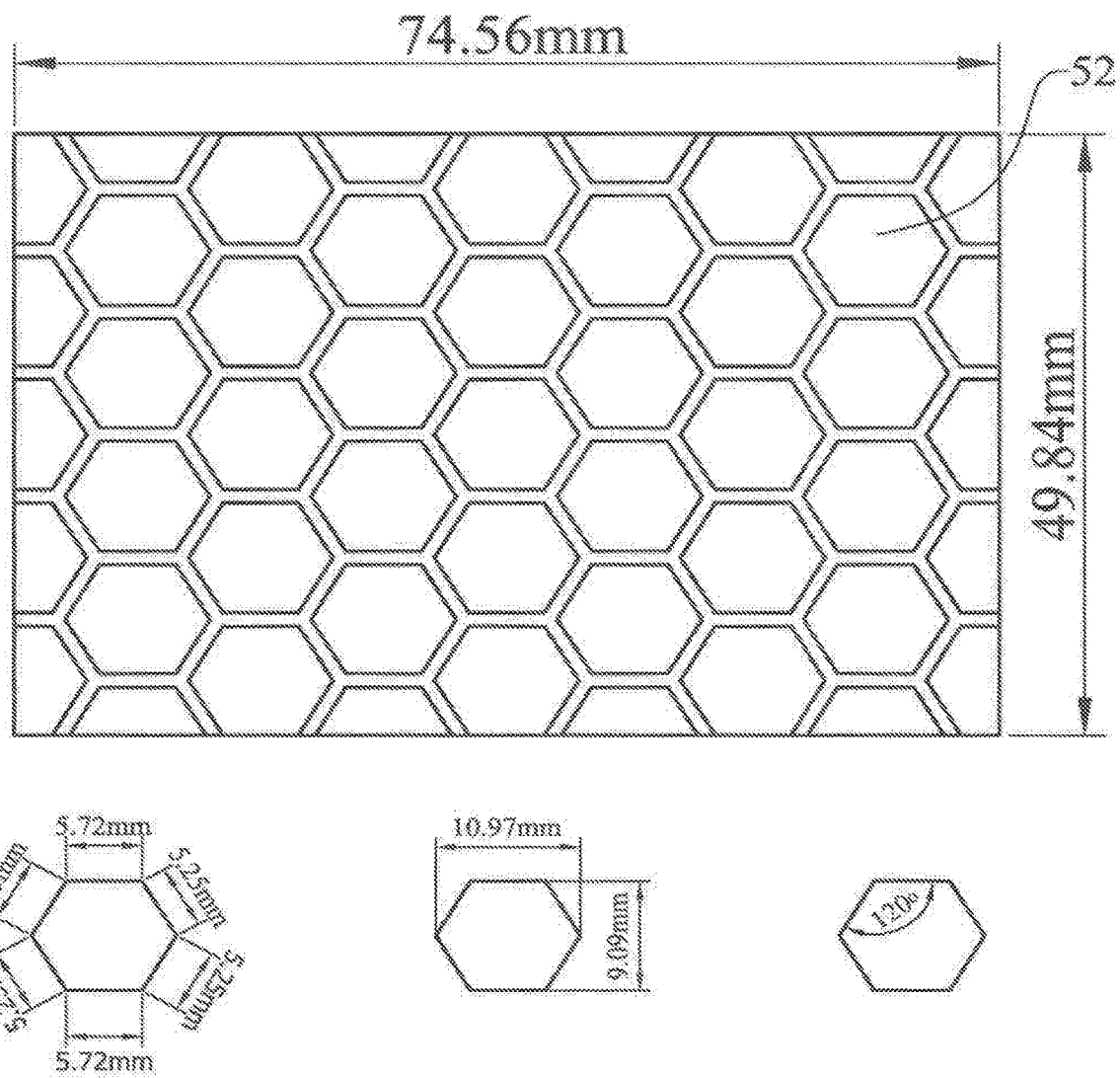
FIGS. 6A-6D is a schematic diagram showing the sizes of the sensor elements and the size of the whole touch sensing area according to the four embodiments of the present invention.
Figure 6B:
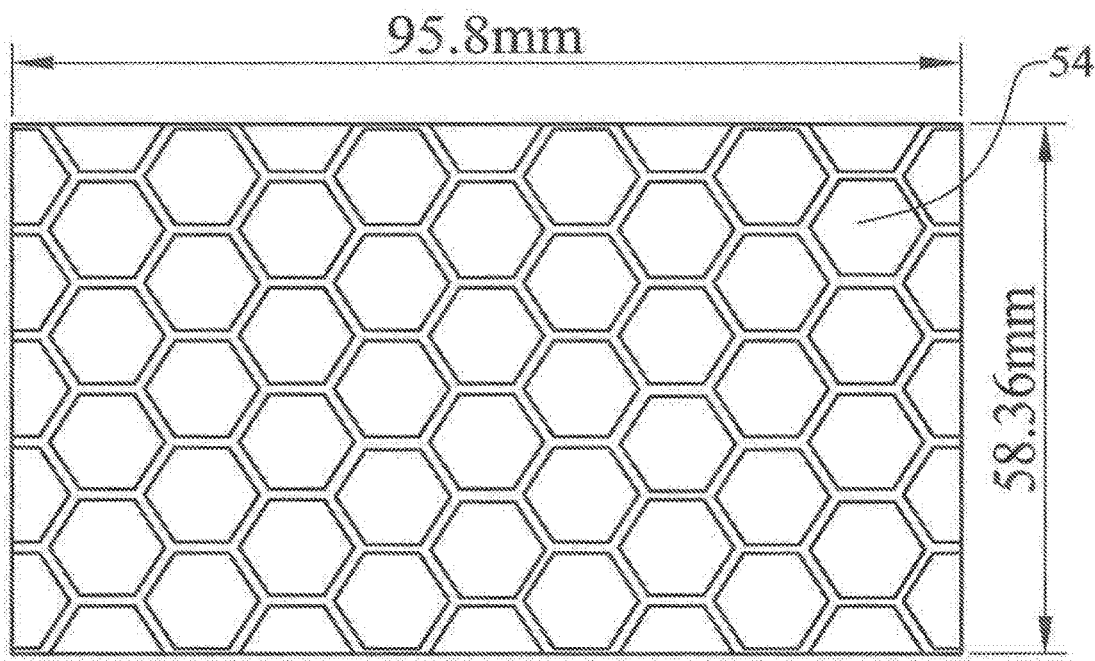
Figure 6B:
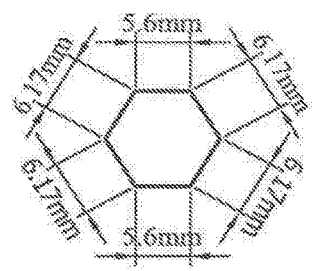
Figure 6B:
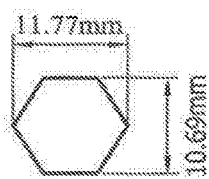
Figure 6B:
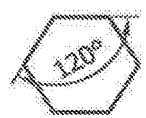
Figure 6C:
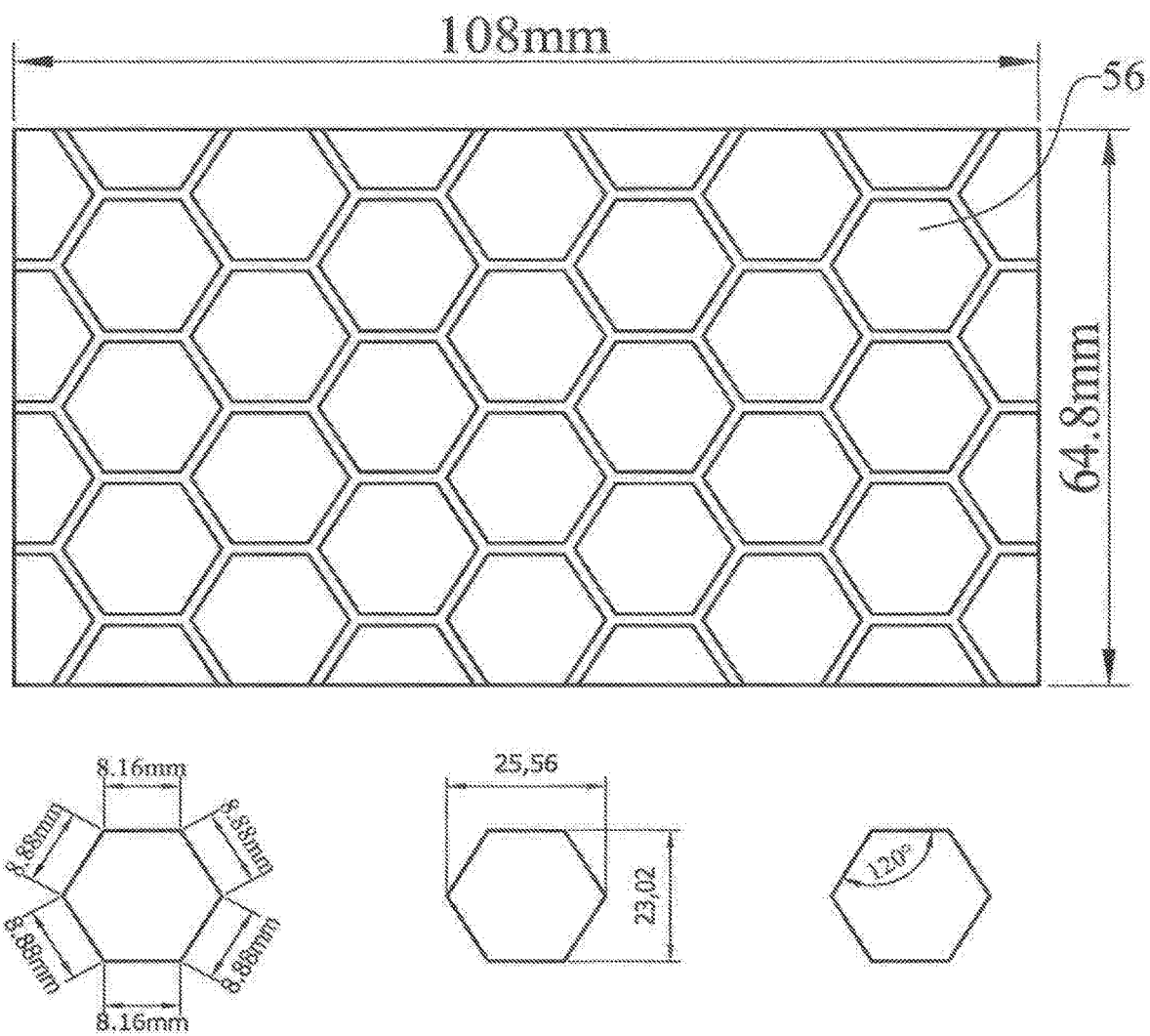
Figure 6D:
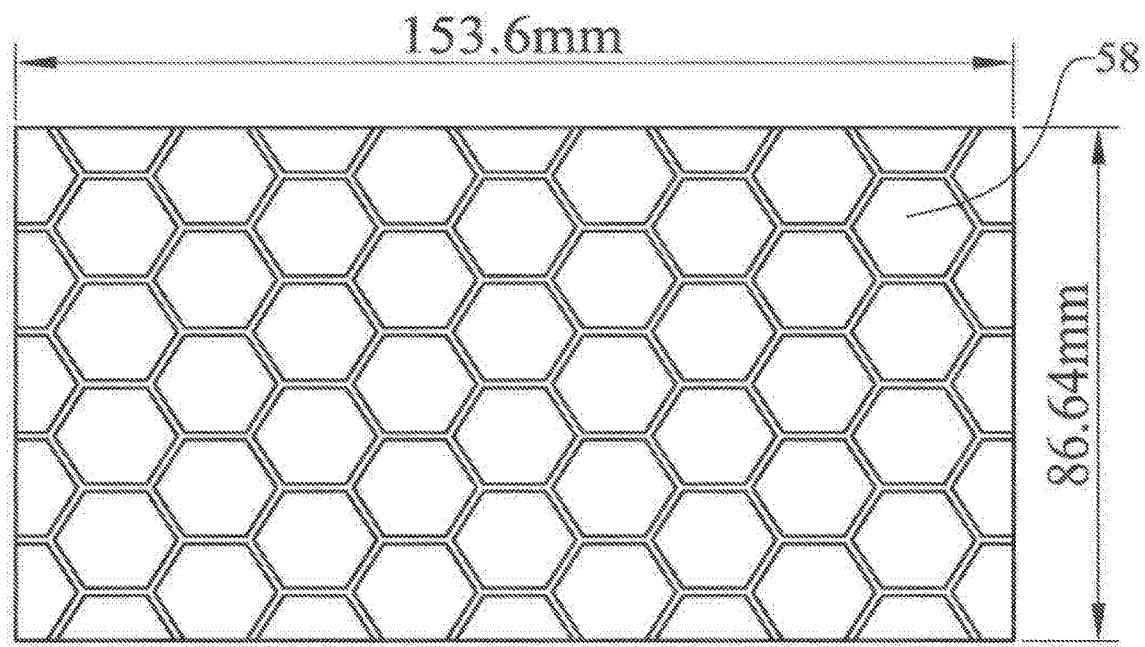
Figure 6D:
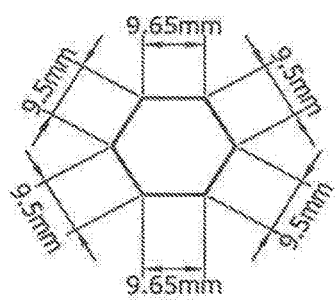
Figure 6D:
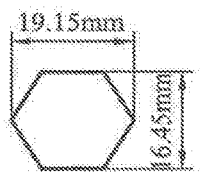
Figure 6D:

FIG. 5B illustrates the connecting structure of the square sensor elements 521-525. For each of of the square sensor elements, the number of stimulus combinations from the adjacent sensor elements is:

$$P(4,4)+P(4,3)+P(4,2)+P(4,1)=1+4+6+4=15$$

Therefore, the number "63" of stimulus combinations in the hexagonal sensor elements is proved larger than the numbers "7" or "15" of stimulus combinations in the triangle or square sensor elements. To sum up, the hexagonal shape providing the most different kinds of stimulus should be the preferred shape for designing the sensor pattern.

Based on the hexagonal pattern of the sensor elements in the invention, different driving schemes can be created for getting better accuracy of the touched position. Once touched sensor element is located roughly, the "divide and conquer" algorithm is used.

To sum up, the touch panel of the invention can locate the different touched positions in a sensor element with high accuracy. Therefore, the sensor element of the invention could be larger than that of the traditional touch panel, and thus the routing traces can be reduced.

To support multi-touch, the sensor elements of the invention are arranged in a way to simulate the two-dimensional sensor array. Instead of the sensor array (electrodes), the sensor element is the fundamental unit on the touch sensor in the invention. And each sensor element of the invention has its own trace routed to the interface pad area on the same plane.

Here is an example to compare the routing traces between a two-dimensional sensor array and a one-dimensional sensor array. In a two-dimensional 7 inches ITO touch panel with 26 electrodes in the horizontal axis and 15 electrodes in the longitudinal axis:

If the touch panel is made of the two-dimensional sensor array, the touch panel may have the number of the routing traces:

$$26+15=41$$

But if the touch panel is made of the one-dimensional sensor array, the touch panel may have the number of the routing traces:

$$26*15=390$$

That is, to cover the same resolution as two-dimensional sensor array, the traditional one-dimensional sensor array needs 390 sensor elements and corresponding traces. The trace number may be more than 1000 if the panel size gets larger. In view of the manufacture, it is not feasible.

To reduce the routing traces, the most efficient way is to reduce the sensor elements on the touch sensor. To fill up the defined area of touch panel, e.g. 4.3, 5 or 7 inches of screen size, the size of the sensor element should be enlarged.

A touch sensor with different size of the sensor element will result different numbers of the sensor elements and the trace routings.

For example, a 4.3 inches touch sensor with the small sensor elements, each of which is width 1.0 cm and height 1.2 cm, has 66 sensor elements, and the same size touch sensor with the large sensor elements, each of which is width 1.5 cm and height 1.8 cm, has 32 sensor elements. Because the touch senor with more sensor elements requires more trace routings, it is obvious that the touch sensor with small sensor elements needs more trace routings and is difficult to produce.

Therefore, the invention with the multi-touch features on the one-dimensional sensor array can use large senor elements and require less trace routings while keeping the accuracy and response time of the touched fingers.

FIGS. 6A-6D is a schematic diagram showing the sizes of the sensor elements and the size of the whole touch sensing area according to the four embodiments of the present invention. By referring to FIG. 5A, the touch panel with the 3.5 inch touch sensing region, i.e., with length and width within the range of 74.56 mm and 49.84 mm, can be configured to be covered by 49 sensor elements 52. Each angle of most of the sensor elements 52 is 120 degrees, and the minimum distance of one pair of opposite edges is 9.09 mm, and the maximum distance of two diagonal vertices is 10.97 mm, the lengths of the each edges are 5.72 mm and 5.25 mm. By referring to FIG. 6B, the touch panel with the 4.3 inch touch sensing region, i.e., with length and width within the range of 95.8 mm and 58.36 mm, can be configured to be covered by 60 sensor elements 54. Each angle of most of the sensor elements 54 is 120 degrees, and the minimum distance of one pair of opposite edges is 10.69 mm, and the maximum distance of two diagonal vertices is 11.77 mm, the lengths of the each edges are 5.6 mm and 6.17 mm. By referring to FIG. 6C, the touch panel with the 5 inch touch sensing region, i.e., with length and width within the range of 108 mm and 64.8 mm, can be configured to be covered by 40 sensor elements 56. Each angle of most of the sensor elements 56 is 120 degrees, and the minimum distance of one pair of opposite edges is 15.38 mm, and the maximum distance of two diagonal vertices is 17.04 mm, the lengths of the each edges are 8.16 mm and 8.88 mm. By referring to FIG. 6D, the touch panel with the 7 inch touch sensing region, i.e., with length and width within the range of 153.6 mm and 86.4 mm, can be configured to be covered by 60 sensor elements 58. Each angle of most of the sensor elements 58 is 120 degrees, and the minimum distance of one pair of opposite edges is 16.54 mm, and the maximum distance of two diagonal vertices is 19.15 mm, the lengths of the each edges are 9.65 mm and 9.5 mm.

In fact, the touch sensing area required by most electronic products are rectangular. Thus, the touch panel 100 of the present invention also has a rectangular region R10 for sensing touch. Further, to detect the touch in the entire rectangular region R10, the touch panel 100 may further include a plurality of second sensor elements 140. The first sensor elements 120 and the second sensor elements 140 may substantially cover the rectangular region R10, while the second sensor elements 140 are adjacent to the edge of the rectangular region R10. The shape of each of the second sensor elements 140 is a half of a sensor element 120. Such shape simplifies the arithmetic process of the returned sensing signals.

The substrate 110 may be a plastic substrate, a glass substrate, or other materials. The materials of the first sensor elements 120, the connecting lines 130 and the second sensor elements 140 are electrically conductive materials, for example, the transparent conductive material, including indium tin oxide or other materials. The first sensor elements 120, the connecting lines 130 and the second sensor elements 140 may be formed in the same processes, including deposition, lithography and etching process, and benefit by the simple process and low cost.

Figure 7:
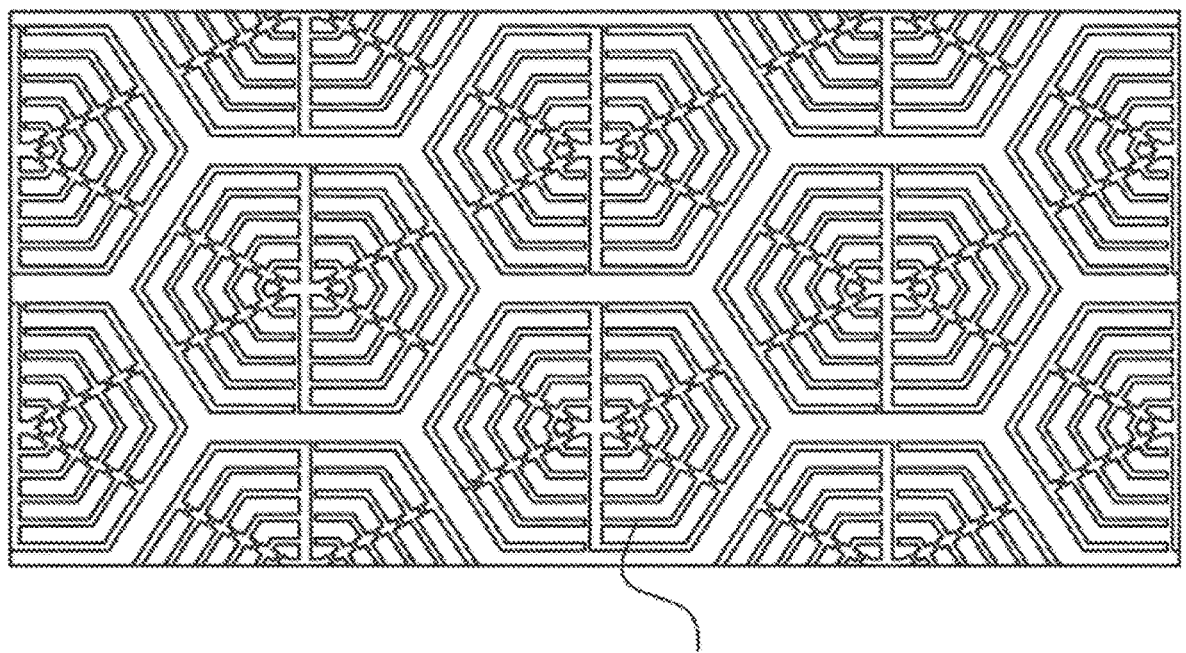
FIGS. 7-9 are schematic views of sensor elements of the touch panels according to three additional embodiment of the present invention.
Figure 8:
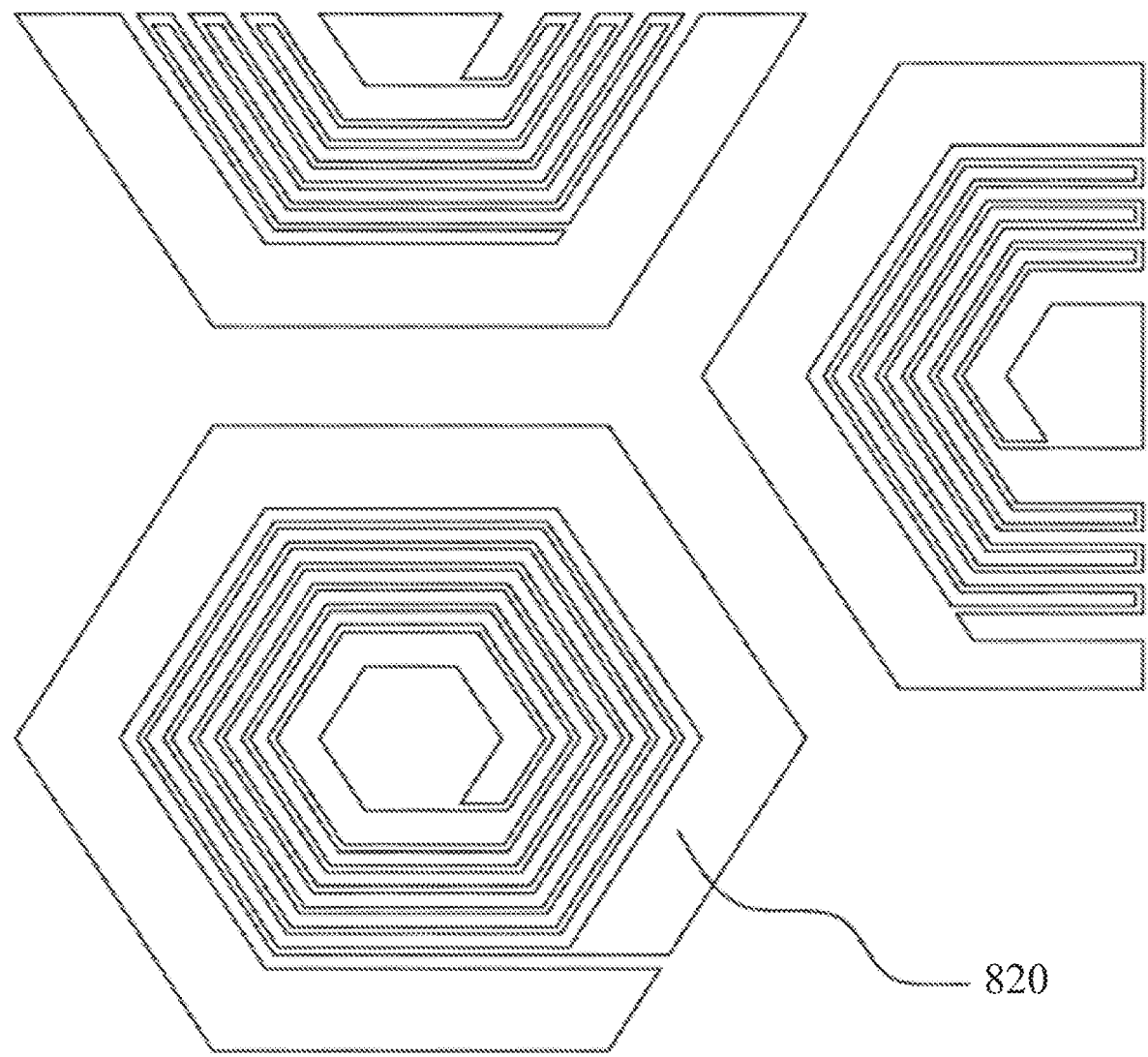
Figure 9:
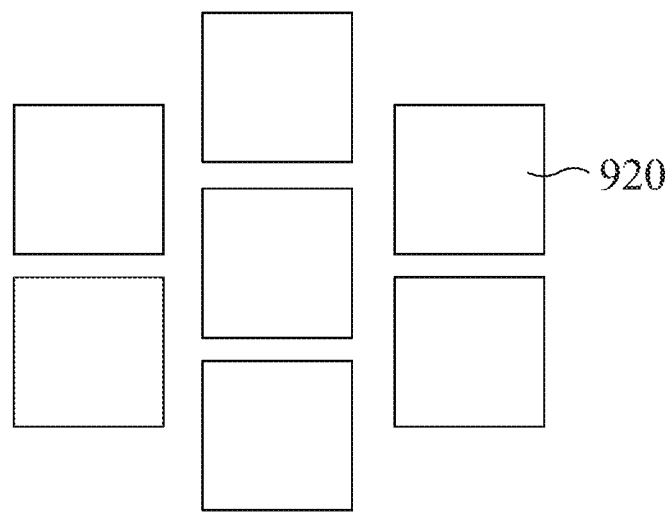

FIGS. 7-9 are schematic views of sensor elements of the touch panels according to three additional embodiment of the present invention, wherein FIG. 8 and FIG. 9 only show a part of the sensor elements. By referring to FIG. 7 and FIG. 8, the sensor elements 720 and 820 are substantially hexagons with hollow portions. To optimize the touch sensing effect, one solution is to change the areas and shapes of the sensor elements 720 and 820. However, as long as each sensor element is surrounded by six sensor elements, the invention can achieved the aforementioned advantages of obtaining high sensing accuracy with the less sensor elements. For example, sensor elements with the snowflake or cyclic shapes may also be applied in the present invention. Alternatively, the sensor element 920 shown in FIG. 9 is rectangular shape, but still surrounded by six sensor elements 920.

The present invention further provides a signal driving method adapted to be used with the above-described touch-sensitive control devices. Take a touch panel comprising a sensor array as illustrated in FIG. 4A as an example. The sensor array includes at least one group of sensor elements as illustrated in any of FIGS. 4B-4E. Referring to the embodiment shown in FIG. 4B, the detection signal S1 sent to each of the sensor elements 120A-120G is generated in response to capacitive coupling between a driving signal line and a connecting line of the associated sensor element. For example, the sensor elements 120A-120G are electrically connected to the control circuit 340 via respective connecting lines. It is to be noted that in order to make drawings neat and easy to read, only are connecting lines 130A-130D shown in FIGS. 4B-4E for illustration. It can be seen in this embodiment that the connecting line 130A is disposed adjacent to the connecting line 130B and the connecting line 130E. Therefore, the connecting lines 130B or 130E, or both can be used as the driving signal line for generating the detection signal S1 at the sensor element 120A by way of the capacitive coupling effect between the driving signal line 130B and/or 130E and the connecting line 130A as long as the interactive portions of the connecting lines are long enough. Subsequently, touch sensing is performed as described in the above embodiments.

Likewise, in the embodiment illustrated in FIG. 4C, for providing the detection signal S2 to the sensor elements 120B, 120C and 120D, a driving signal is applied to the connecting line or lines adjacent to the connecting line of each the associated sensor element to induce capacitive coupling. For example, the connecting line 130C may serve as the drive signal line of the sensor element 120B; the connecting line 130B may serve as the drive signal line of the sensor element 120C; and the connecting line 130E may serve as the drive signal line of the sensor element 120D. By applying a driving signal to the drive signal lines, the capacitive coupling between 130B and 130C, and the capacitive coupling between 130D and 130E, would render generation of the detection signal S2 at the sensor elements 120B, 120C and 120D. Similar means can be applied to the embodiment illustrated in FIG. 4D and the embodiment illustrated in FIG. 4E to generate the detection signal S3 and S4, and is not to be redundantly described herein. It is understood the length of interactive connecting lines may vary with practical designs. Therefore, it is preferred that the intensity of the driving signal is properly adjusted depending on the length of interactive connecting lines in order to provide a desirable level of capacitive coupling effect.

Figure 10:
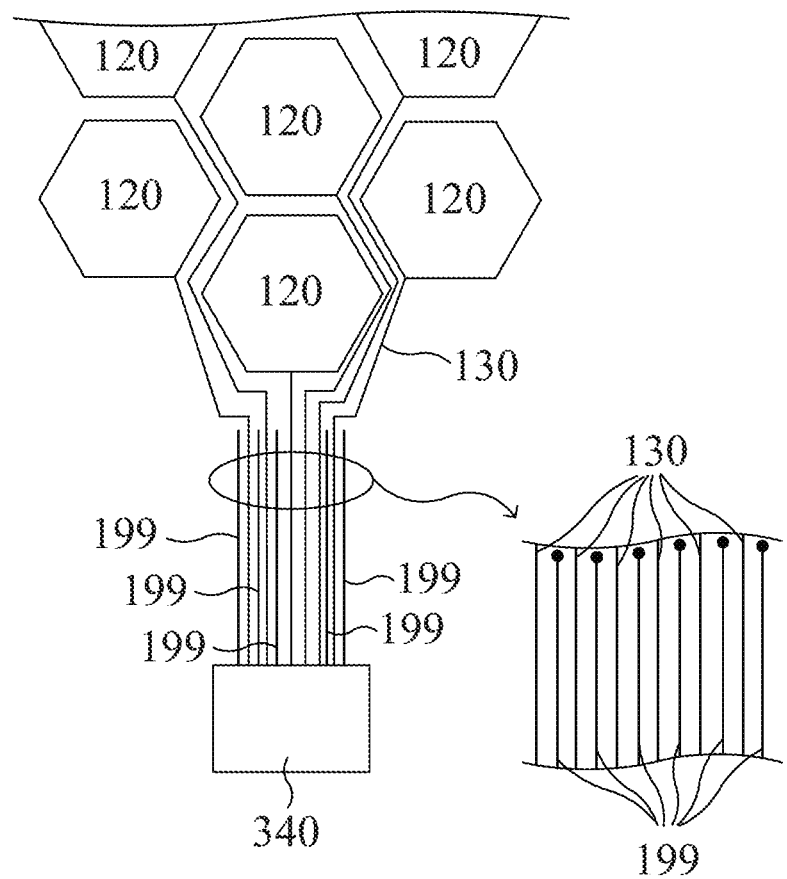
FIG. 10 is a schematic diagram illustrating driving means according to an embodiment of the present invention.

FIG. 10 schematically illustrate an alternative embodiment of signal driving method. In this embodiment, an existing non-connecting line of the control circuit 340 or an additional dummy line 199 can be used as a driving signal line for capacitive coupling to the associated connecting line 130, thereby generating the detection signal. As shown, the dummy line 199 is disposed adjacent to the associated connecting line 130 and having one end floating and the other end electrically connected to the control circuit 340. In an embodiment, the sensor elements, the connecting lines and the dummy line are simultaneously formed in the same process.

In summary, the touch panel of the present invention detecting the signals from each sensor element surrounded by six sensor elements can obtain a higher sensing accuracy with less sensor elements, and thereby reduce the wiring design difficulties.

To sum up, the advantages of this invention includes: (1) the design for manufacture by resolving the routing issues;

(2) the faster response time by reducing the number of sensor elements; (3) the improvement of the touch accuracy on one-dimensional sensor array; (4) the larger sensor elements with the higher touch accuracy; and (5) the reduction of the manufacture cost while maintaining the touch performance as 2-dimensional sensor array.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch panel, comprising:
    a substrate defining thereon a touch sensing region;
    a sensor array formed in the touch sensing region and consisting of sensor elements separately positioned on the substrate, and defined as a plurality of groups, wherein the sensor elements in the same group include a central sensor element and a plurality of surrounding sensor elements; and
    connecting lines arranged on the substrate and corresponding to the sensor elements one on one, wherein each of the connecting lines is connected to one and only one of the sensor elements corresponding thereto;
    wherein the central sensor element is shaped as a regular hexagon and surrounded by six surrounding sensor elements at six edges of the regular hexagon, respectively, and the six surrounding sensor elements are defined as a plurality of sets of surrounding sensor elements, which are respectively driven with corresponding connecting line or lines, and return signals for determining which part of the central sensor element is touched, wherein the plurality of sets of surrounding sensor elements consist of an equal number of surrounding sensor elements,
    wherein there is a gap in each group of sensor elements, and at least a first one and a second one of the connecting lines connected to the same group of sensor elements pass through the same gap, and
    wherein the first one of the connecting lines serves as a driving signal line, and is applied thereto a driving signal to induce a capacitive coupling to the second one of the connecting lines so as to drive the sensor element which the second one of the connecting lines is connected to.

2. The touch panel according to claim 1, wherein each of the surrounding sensor elements is directly adjacent to the central sensor element.

3. The touch panel according to claim 1, wherein each of the surrounding sensor elements serves as a central sensor element in another group of sensor elements.

4. The touch panel according to claim 1, wherein each set of surrounding sensor elements equally consists of one, two or three surrounding sensor elements.

5. The touch panel according to claim 1, further comprising at least one dummy line, each disposed adjacent to one of the connecting lines and serving as a driving signal line, wherein a driving signal is applied to the driving signal line to induce a capacitive coupling to the adjacent connecting line so as to drive the sensor element which the adjacent connecting lines is connected to.

6. The touch panel according to claim 5, wherein the dummy line has one end floating and the other end electrically connected to a control circuit together with the connecting lines.

7. The touch panel according to claim 5, wherein the sensor elements, the connecting lines and the dummy line are simultaneously formed in the same process.

8. The touch panel according to claim 1, wherein all the connecting lines in the touch sensing region are formed directly on the same surface of the substrate.

9. The touch panel according to claim 1, wherein a size of each of the sensor elements is smaller than an area that two fingertips occupy.

10. The touch panel according to claim 1, wherein each of the sensor elements is driven and returns a signal for determining occurrence of a touch operation and which sensor element is touched so as to serve as the central sensor element.

11. A touch panel, comprising:
    a substrate defining thereon a touch sensing region;
    a sensor array formed in the touch sensing region and consisting of sensor elements separately positioned on the substrate; and
    connecting lines arranged on the substrate and corresponding to the sensor elements one on one, wherein each of the connecting lines is connected to one and only one of the sensor elements corresponding thereto, and at least a first one and a second one of the connecting lines are disposed adjacent to each other;
    wherein the first one of the connecting lines serves as a driving signal line, and applied thereto a driving signal to induce a capacitive coupling to the second one of the connecting lines so as to drive the sensor element which the second one of the connecting lines is connected to, and the driven sensor element and/or the sensor elements surrounding the driven sensor elements in the sensor array return signals for capacitive touch detection associated with the drive sensor element in response to the driving signal.

12. A touch panel, comprising:
    a substrate defining thereon a touch sensing region;
    a sensor array formed in the touch sensing region and consisting of sensor elements separately positioned on the substrate;
    connecting lines arranged on the substrate and corresponding to the sensor elements one on one; and
    at least one dummy line disposed adjacent to one of the connecting lines;
    wherein the dummy line serves as a driving signal line, and a driving signal is applied to the driving signal line to induce a capacitive coupling to the adjacent connecting line so as to drive the sensor element which the adjacent connecting lines is connected to, and the driven sensor element and/or the sensor elements surrounding the driven sensor elements in the sensor array return signals for capacitive touch detection associated with the drive sensor element in response to the driving signal.

13. The touch panel according to claim 12, wherein the dummy line has one end floating and the other end electrically connected to a control circuit together with the connecting lines.

14. The touch panel according to claim 12, wherein the sensor elements, the connecting lines and the dummy line are simultaneously formed in the same process.

* * * * *